March 23, 1943.　　J. L. ANDERSON　　2,314,437
CAN WELDING MACHINE
Filed May 11, 1940　　2 Sheets-Sheet 1

INVENTOR
James L. Anderson
BY
ATTORNEY

March 23, 1943.  J. L. ANDERSON  2,314,437
CAN WELDING MACHINE
Filed May 11, 1940  2 Sheets-Sheet 2

INVENTOR
James L. Anderson
BY
J. F. Brandenburg
ATTORNEY

Patented Mar. 23, 1943

2,314,437

UNITED STATES PATENT OFFICE 2,314,437

CAN WELDING MACHINE

James L. Anderson, Closter, N. J., assignor to Air Reduction Company, Incorporated, New York, N. Y., a corporation of New York Application May 11, 1940, Serial No. 334,521

10 Claims. (Cl. 113—67)

This invention relates to machines for welding cans, and especially the circumferential seam by which the bottom of a can is connected with the side.

In the welding of a number of separate units, such as individual cans, where there is comparatively little welding to be done on each unit after which that unit must be removed and replaced with another, it is largely the manner of handling the separate units to be welded that sets the limit on the output of the machine.

It is an object of this invention to provide an improved welding machine with can-holding means to which a can may be applied, and from which the can may be removed, quickly and conveniently with a minimum of lost time between successive welding operations.

The preferred embodiment of the invention is a machine for welding milk cans, and the can-holder is shaped to fit a milk can and hold it in a given relation to a torch while the can is rotated. There are releasable clamping means for retaining a milk can in position on the can-holder.

It may be said, therefore, that another object of the invention is to provide improved apparatus for quickly clamping a can to holding apparatus that rotates the can during the welding operation.

By reducing the time required to weld the seams of cans, the cost of manufacture is reduced, and it is another object of the invention to provide apparatus for making welded cans more economically.

Other objects, features and advantages of the invention will appear or be pointed out as the specification proceeds.

In the accompanying drawings, forming part hereof:

Figure 1:
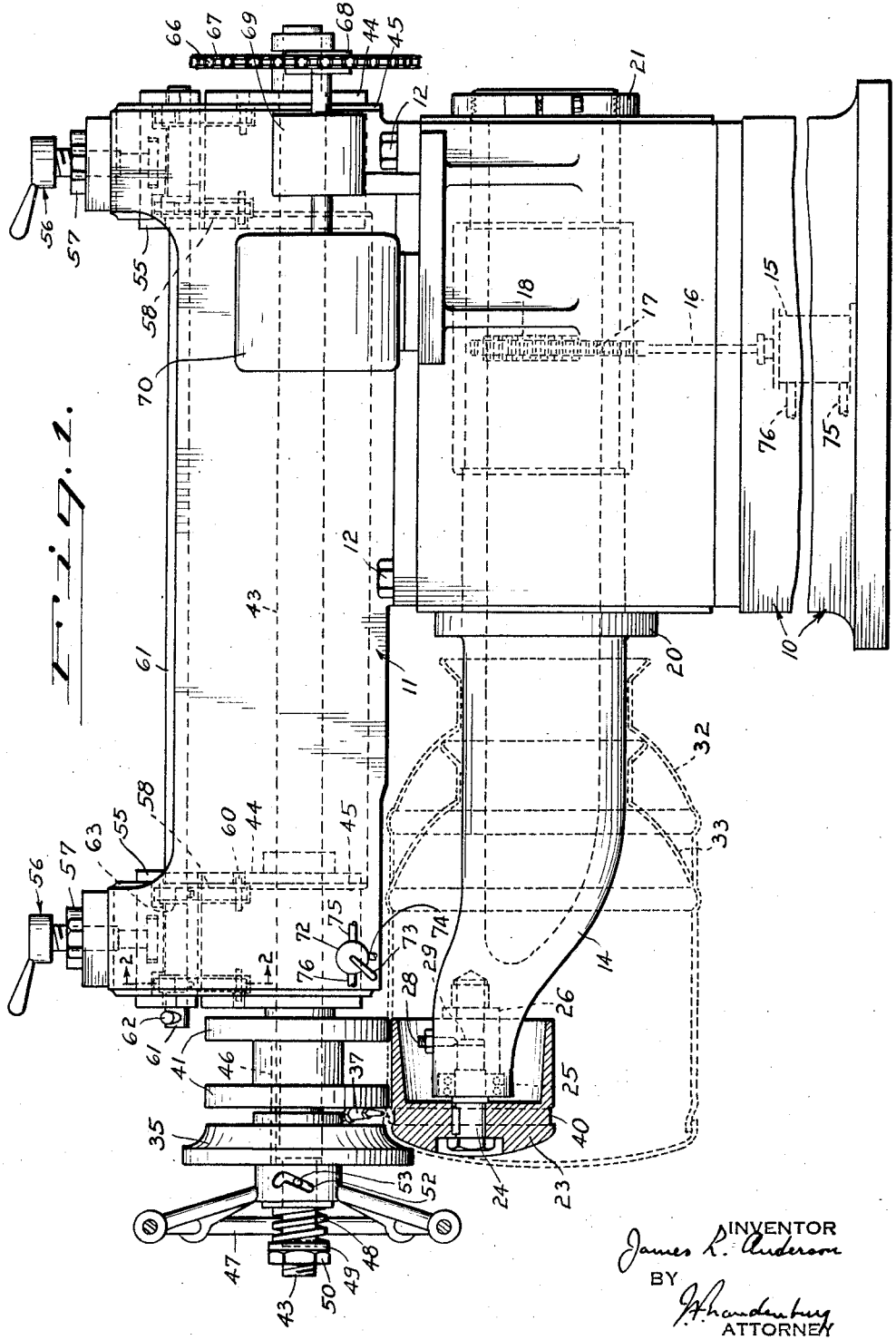
Fig. 1 is a side elevation, partly in section, of a can-welding machine embodying this invention.

The machine includes a hollow base 10 and an upper frame 11 fastened to the base by screws 12. A support 14 that is tubular along most of its length is journaled in bearings in the walls of the base 10 and can be rotated in these bearings by a motor 15 that is anchored to the base and moves a piston rod 16 and rack 17, the latter meshing with a gear segment 18 on the support 14. The support 14 is held against axial displacement rearwardly by a flange 20 at the front of the base 10, and is held against forward displacement by a split nut 21 clamped to a threaded end of the support 14.

A supporting roller 23 is keyed to a shaft 24 that turns in bearings 25, 26 about an axis that is parallel to but eccentric of or offset from the axis about which the support 14 turns. The forward bearing 25 takes both thrust and radial loads of the roller 23. The shaft 24 is held against displacement forward by a set-screw 28 that threads through the support 14 and extends into a circumferential groove 29 in the shaft 24. The set-screw 28 is held in fixed relation by a lock nut.

The internal-support roller 23 is somewhat smaller than the mouth of a milk can 32 so that the cans can be slipped over the roller 23 and into the position shown in Fig. 1. A milk can 33 of the same diameter but less height is also shown in dotted lines on the roller 23 in position to be welded. The tubular portion of the support 14 is small enough for the cans to fit over it freely, but high enough to hold each can in substantially the position for welding before the can is clamped against the roller 23 by a clamping roller 35. The roller 23 is a rotatable holder on which the cans rest.

The roller 23 is shaped to fit into the corner where the bottom of the milk can meets the side, and the clamping roller 35 has a recessed face that fits the bottom edge of the can and contacts with the side and bottom of the can at the same time. The clamping roller 35 thus holds the can in a definite position with respect to the support and in a definite relation to a welding torch 37 that is supported by a torch-holder 38 (Fig. 2) at the end of a bracket 39 which is fastened to the frame 10.

The torch 37 is adjustable in the holder 38 by rack and pinion mechanism toward and from the can seam that is to be welded. The roller 23 preferably has a circumferential groove 40 under the seam, as shown in Fig. 1. On the upper side of the seam a driving roller or pair of driving rollers 41 contact with the can. These rollers 41 touch the outside of the can in the same region of the can wall as the roller 23 contacts with the inside of the can. The driving rollers 41 are in frictional contact with the outside surface of the can and press the can against the inside roller 23 to obtain the pressure necessary to produce sufficient friction for driving.

The clamping roller 35 and driving rollers 41 are keyed to a shaft 43 that turns in bearings in blocks 44, which are vertically movable in guides 45 at opposite ends of the frame 11. The rollers 41 are a press fit on the shaft 43 and are not axially movable on the shaft. The clamping roller 35, however, is a running fit on the shaft 43, and while the roller 35 cannot turn independently of the shaft 43 because of the key 46, this roller 35 can slide axially along the shaft 43 and key 46.

A hand-wheel 47 on the shaft 43 is thrust against the clamping roller 35 by a spring 48 compressed between the clamping roller 35 and a washer 49 and nut 50 at the end of the shaft 43. Under pressure from the spring 48 the hand-wheel 47 holds a reduced-diameter hub portion of the clamping roller 35 against a side of the driving roller 41 when there is no can in the machine, but with a can on roller 23 the clamping roller 35 comes into contact with the can and is held away from the roller 41.

The clamping roller 35 can be relieved of the pressure of the spring 48 by turning the hand-wheel 47 to the right. A cam slot 52 in the hub of the hand-wheel 47 cooperates with a stud 53 extending from the shaft 43 to move the hand-wheel axially against the pressure of the spring 48 when the hand-wheel is turned on the shaft. There is a similar cam slot and stud 53 on the side of the hand-wheel hub opposite that shown in Fig. 1. Rest stops at the ends of the cam slots 52 cause the hand-wheel 47 to stay back and keep the spring 48 compressed after the cam slots 52 have been turned as far as they can go. The nut 50 is adjustable along threads on the end of the shaft 43 to change the pressure of the spring 48.

There are blocks 55 in the guides 45 above the blocks 44. These upper blocks 55 are movable up and down in the guides 45 by screw-downs 56 that can be secured in any set position by lock nuts 57. The lower blocks 44 are connected to the upper blocks 55 by links 58.

These links 58 extend into recesses in the upper and lower blocks 55 and 44. At their lower ends the links 58 are connected to the blocks 44 by pivot pins 60. A shaft 61 extends through bearings in both of the upper blocks 55 and has a handle 62, secured to its forward end, for turning the shaft. There are eccentrics 63, best illustrated in Fig. 2, on the shaft 61 in line with each of the links 58.

The links 58 have bearings extending around the eccentrics 63 so that when the shaft 61 is rotated the eccentrics 63 raise or lower the links 58 and the blocks 44 which are connected to the lower ends of the links. The eccentrics 63 are preferably integral with the shaft 61.

The shaft 43 has a sprocket 66 secured to one end, and this sprocket is driven by a chain 67 from a smaller sprocket 68 at the low-speed end of a reduction gear unit 69 connected to an electric motor 70.

Figure 2:
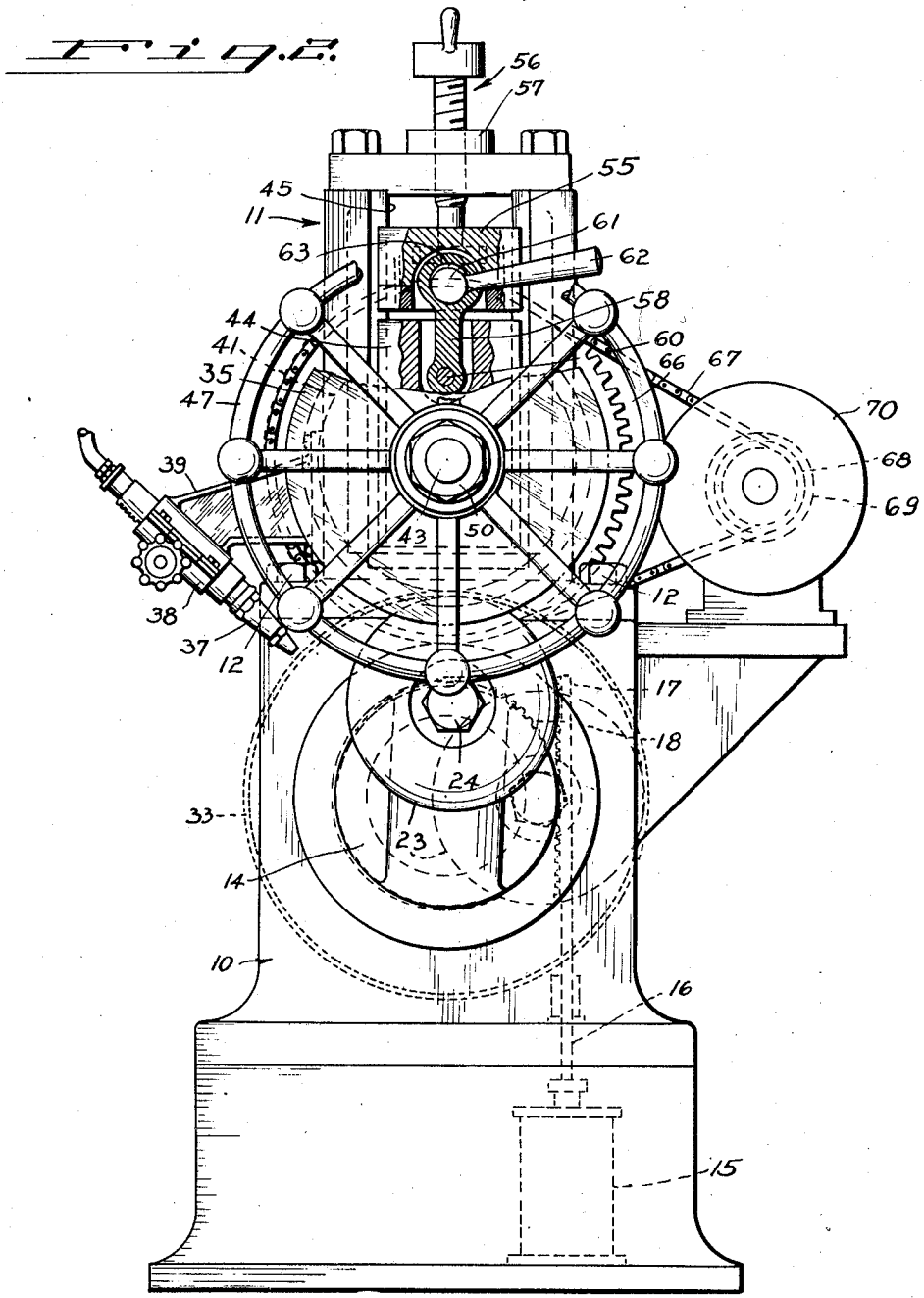
Fig. 2 is a front elevation, on an enlarged scale, partly broken away and partly in section, of the can-welding machine shown in Fig. 1.

The can 33 or 32 is slipped over the roller 23 and onto the full-diameter tubular portion of the support 14 while the support is turned and the roller 23 is in a lowered position, such as the dotted line position shown in Fig. 2. When the can is in place on the support 14, the motor 15 is operated to turn the support and bring the roller 23 into a position above the axis of rotation of the support. The roller 23 is shown in such a position by full lines in Fig. 2.

The axis of the roller 23 need not be directly over the axis of the support 14, but a line connecting these axes should come near enough to the vertical so that the downward force of the rollers 35 and 41 when brought against the can on the roller 23 will not have any substantial tangential component tending to rotate the support 14.

The motor 15 is preferably operated by compressed air controlled by a two-way valve 72 with a handle 73 located within convenient reach of the operator of the machine. When the handle is in one position, the valve 72 permits compressed air to flow from a supply pipe 74 through a pipe 75 to the lower end of the cylinder of the motor 15, and at the same time puts a pipe 76 from the upper end of the cylinder in communication with the atmosphere for exhaust.

When the handle 73 is in another position, the compressed air is supplied to the pipe 76, and the pipe 75 is open to exhaust. With the valve in such a position the motor 15 operates to lower the rack 17 and turn the support 14 to lower the roller 23 into the dotted-line position shown in Fig. 2.

The operation of the machine is as follows:

The can is slipped over the roller 23 and pushed over the support 14 until the bottom of the can comes against the side of the roller 23 with the roller 23 in the dotted-line position shown in Fig. 2.

The valve handle 73 is turned into position to cause the motor 15 to raise the rack 17 and turn the support 14 until the roller 23 reaches the full-line position shown in Fig. 2.

The hand-wheel 47 is then turned to move the rest stops of the cam slot 52 away from the studs 53, and the spring 48 then pushes the clamping roller 35 against the bottom of the can. This pressure pushes the can against the side of the roller 23 if it is not already in contact. By pushing the can against the side of the roller 23, the clamping roller 35 insures that the can is always in a definite relation to the roller 23 and the support 14 during a welding operation.

The handle 62 at the end of the shaft 61 is then operated to turn the eccentrics 63 and force the blocks 44 down until the roller 35 and driving rollers 41 are against the side wall of the can. The pressure which these rollers exert against the can when the handle 62 is turned to a given position is determined by the positions of the blocks 55 and can be changed by adjusting the screw-downs 56.

The external rollers 35 and 41 rotate continuously while the machine is in use, and so does the hand-wheel 47, but the speed is not fast enough to interfere with manual rotation of the hand-wheel 47 relative to the shaft 43.

With the can held in a definite position on the support 14 by the clamping roller 35, and rotated at a uniform speed by the driving rollers 41 and clamping roller 35, the torch 37 is then adjusted to the correct distance from the can seam and welds the seam as the can rotates.

When the weld has been completed around the entire circumference of the can, the torch is backed away, the handle 62 operated to lift the shaft 43 and remove the driving rollers 41 from contact with the can, the hand-wheel 47 turned to relieve the clamping roller 35 of the pressure of spring 48, the motor 15 operated to turn the support 14, and the can is then withdrawn from the support and a new unwelded can put in place for the next cycle of operation.

The preferred embodiment of the invention has been described, but it will be understood that terms of orientation are relative, that changes and modifications can be made, and that some features of the invention can be used without others.

I claim:

1. A welding machine in which a can is rotated to move a circular seam of the can past a welding torch, said machine including a can support comprising a roller of substantially smaller cross-section than the interior of the can and having a shape that fits the inside corner of the can so that said roller contacts, along a substantial length of surface, with both the bottom and the side of the can, to restrain the can against both radial and endwise displacement, a support on which the roller turns, clamping rollers in position to contact with the outside of the side and bottom of the can, in the region of the bottom corner of the can and adjacent said roller, for holding the bottom and side of the can against said roller when the roller rotates and thereby positioning the can in a definite relation to the welding torch, and means for rotating the can past the welding torch.

2. In a welding machine, supporting structure for holding a can to be welded in a definite relation to a welding torch, said structure including a supporting roller that rotates about a substantially horizontal axis and that is of substantially smaller cross-section than the interior of the can, said roller having a shape that fits into the inside corner of the cain so that said roller contacts, along a substantial length of surface, with both the bottom and the side of the can to restrain the can against both radial and endwise displacement, a clamping roller with a face having a recessed surface that contacts with the outside of the bottom edge of the can and exerts a diagonal thrust that holds both the bottom and side of the can against the inside supporting roller, a driving roller that contacts with the outside of the can at a region where the side of the can rests on the inside supporting roller, means for causing relative movement of the supporting roller and driving roller toward and from one another in a direction transverse of the axes of rotation of the rollers, and a holder for supporting the welding torch in position to weld a circumferential seam of the can as the can rotates on said supporting structure.

3. In a machine for welding cans, a supporting roller over which a can fits and on which the can rotates to move a circumferential seam of the can progressively past a welding torch, an axle having an axis about which the supporting roller rotates. a second roller that contacts with the outside of the can for urging the can against the inside roller during the rotation of the can past the welding torch, two different means for moving the rollers with respect to one another including roller-shifting apparatus for producing a substantial movement of one of the rollers toward and from the other in a direction transverse of the axis of rotation of the supporting roller so that the rollers can be separated for the removal of a welded can and the placement of another can on said supporting roller, and pressure-control apparatus operable independently of said roller-shifting apparatus and of different mechanical advantage from the roller-shifting apparatus for producing a minor movement of one of the rollers with respect to the other to control the pressure of the rollers against the can.

4. A can-welding machine comprising a rotatable support that contacts with the inside surface of a can, a clamping roller that bears against the outside of the can and holds said can in a definite position on the rotatable support, an axle on which said support rotates about an axis, means for moving the support and clamping roller toward and from one another in a direction transverse of said axis, a device other than said means and having a different mechanical advantage from said means for moving the clamping roller into actual contact with the can for holding the can in a definite relation to a welding torch after the support and clamping roller have been moved toward one another in said direction transverse of the axis, and pressure control apparatus operable independently of said means and said device to change the pressure that the clamping roller exerts against the can when brought into contact with the can by operation of said device for moving the clamping roller into actual contact with the can.

5. A welding machine including a supporting roller that rotates about an axis and that contacts with the inside surface of the can to hold the can during a welding operation, a driving roller that rotates about an axis and holds the can against the supporting roller and that rotates the can by contact with the outside surface of the can, two apparatuses for shifting the rollers with respect to one another including mechanism for displacing one of the rollers toward and from the other in a direction transverse of the axis of rotation of the driving roller, and other mechanism of different mechanical advantage for displacing the driving roller transverse of its axis toward and from the supporting roller to control the pressure of the driving roller against the can.

6. In a can-welding machine, a roller that contacts with the outside surface of the can during a welding operation, another roller that contacts with the inside surface and on which the can rests while being welded, two independently-operated means for causing relative movement of the rollers toward and from one another for a distance that separates the rollers far enough for convenient removal of a welded can and the placement of another can over the roller that contacts with the inside surface of the can, said means comprising apparatus including a motor for effecting the major portion of the relative movement, and a manually-operated device including a can that operates independently of the power-operated apparatus and with a substantial mechanical advantage for effecting the final portion of the relative movement of the rollers toward one another and the initial portion of their movement from one another.

7. A weld machine including in combination a frame, a support journaled in bearings in said frame, said support including a roller for holding a can during a welding operation, the axis of said roller being offset from the axis of the support bearings so that rotation of the support in said bearings shifts the roller and can transversely of the roller axis, a drive shaft, a motor connected with the drive shaft, a driving roller secured to the drive shaft, means for moving the shaft to shift the driving roller into contact with a can on the support roller when said support is turned into a position that brings the can close to the drive shaft and a holder for supporting a welding torch in position to weld a circumferential seam of the can as the can rotates on said support.

8. A welding machine including in combination a frame, a support journaled in bearings in said frame, said support including a roller for holding a can during a welding operation, the axis of said roller being offset from the axis of the support bearings so that rotation of the support in said bearings shifts the roller and can transversely of the roller axis, a drive shaft, a motor connected with the drive shaft, a driving roller secured to the drive shaft, a clamping roller on the drive shaft, said clamping roller being of larger diameter than the driving roller and shaped to contact with the bottom edge of a can with which the driving roller is in frictional contact, means for moving the clamping roller axially along the drive shaft to bring it against the lower edge of a can, and means for moving the shaft closer to and further from the support roller to control the contact of the driving roller with the can.

9. A welding machine including a stationary frame, a can support journaled in the frame, a roller on the support, the axis of rotation of said roller being parallel to but offset from the axis of rotation of the support in the frame so that rotation of the support in the frame causes movement of the roller transverse of its axis of rotation, a drive shaft parallel to the axis of the support roller, a driving roller secured to the drive shaft, a clamping roller of larger diameter than the driving roller and axially movable along the drive shaft for holding the bottom of a can that is resting on the support roller against the side of said support roller, blocks in which the drive shaft turns, guides in which the blocks are movable at right angles to the axis of the drive shaft, other blocks in the guides, one above each of said blocks in which the drive shaft turns, screwdown devices for shifting the upper blocks along the guides and for holding said upper blocks in set positions in the guides, link means connecting the upper and lower blocks in each guide including eccentrics operable to move the connected blocks closer or apart, a common shaft to which the eccentrics of the different link means are secured, and a handle for turning said common shaft to move the drive shaft and the rollers on said drive shaft toward or from a can on the support.

10. A machine for welding circumferential seams of cans including in combination, a frame, supporting means that extend within a can and that comprise the sole support for the can during a welding operation, said means including a roller, a support on which the roller rotates, bearings having axes parallel to but eccentric of the axis of rotation of said roller and in which the support rotates in the frame, apparatus for turning the support in said bearings to raise and lower the rotatable roller and a can that is resting on said roller, roller means that contact with the outside of the can for holding the can against displacement on said sole support, and welding means so correlated with the can-supporting means that the raising and lowering of the roller moves the can into and out of position to be operated upon by the welding means.

JAMES L. ANDERSON.

CERTIFICATE OF CORRECTION.

Patent No. 2,314,437.                                    March 23, 1943.

JAMES L. ANDERSON.

It is hereby certified that error appears in the printed specification of the above numbered patent requiring correction as follows: Page 3, first column, line 30, for "cain" read --can--; second column, line 47, for "can" read --cam--; line 54, for "weld" read --welding--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.